(12) United States Patent
Rane et al.

(10) Patent No.: US 9,699,214 B2
(45) Date of Patent: Jul. 4, 2017

(54) SYSTEM FOR POLICY-MANAGED CONTENT PRESENTATION

(71) Applicant: Sequitur Labs Inc., Issaquah, WA (US)

(72) Inventors: Abhijeet Rane, Bellevue, WA (US); Daniel Schaffner, Seattle, WA (US); Philip Attfield, Fall City, WA (US)

(73) Assignee: Sequitur Labs Inc., Issaquah, WA (US)

( * ) Notice: Subject to any disclaimer, the term of this patent is extended or adjusted under 35 U.S.C. 154(b) by 0 days.

(21) Appl. No.: 14/616,414

(22) Filed: Feb. 6, 2015

(65) Prior Publication Data
US 2015/0312277 A1    Oct. 29, 2015

Related U.S. Application Data

(60) Provisional application No. 61/937,749, filed on Feb. 10, 2014.

(51) Int. Cl.
| | | |
|---|---|---|
| *G06F 21/00* | (2013.01) | |
| *H04L 29/06* | (2006.01) | |
| *G06F 21/62* | (2013.01) | |
| *G06F 21/60* | (2013.01) | |

(52) U.S. Cl.
CPC .............. *H04L 63/20* (2013.01); *G06F 21/60* (2013.01); *G06F 21/602* (2013.01); *G06F 21/6218* (2013.01)

(58) Field of Classification Search
CPC ........ G06F 21/60; G06F 21/604; G06F 21/62; G06F 21/6209; G06F 21/6218; G06F 21/6272
See application file for complete search history.

(56) References Cited

U.S. PATENT DOCUMENTS

| | | |
|---|---|---|
| 5,881,225 A | 3/1999 | Worth |
| 7,140,035 B1 | 11/2006 | Karch |
| 7,246,233 B2 | 7/2007 | Brabson et al. |
| 7,640,429 B2 | 12/2009 | Huang et al. |

(Continued)

FOREIGN PATENT DOCUMENTS

| | | |
|---|---|---|
| WO | PCT/US14/70897 | 12/2014 |
| WO | WO 2015/026389 | 2/2015 |

OTHER PUBLICATIONS

"Computer Architecture: A Quantitative Approach", Hennessy J. and Patterson, D., 5th Ed. Morgan Kaufman (2011).

(Continued)

*Primary Examiner* — Edward Zee
(74) *Attorney, Agent, or Firm* — LaRiviere, Grubman PC

(57) ABSTRACT

The invention pertains to a system and method to display contextual information, including data and messaging, based on a secure, policy-managed set of instructions for selecting, distributing, and presenting information on a device. The system accepts one or more streams of contextual information in any digital form from one or more data sources. The contextual information is assessed via a set of policy instructions that may include time, location, hierarchy of ownership, type of contextual information, assessed importance of the contextual information, and display availability. Only approved contextual information is transmitted to the device for display.

18 Claims, 4 Drawing Sheets

(56) References Cited

U.S. PATENT DOCUMENTS

| | | |
|---|---|---|
| 8,127,982 B1 | 3/2012 | Casey et al. |
| 8,285,249 B2 | 10/2012 | Baker et al. |
| 8,463,819 B2 | 6/2013 | Shashikumar et al. |
| 8,468,586 B2 | 6/2013 | Koottayi et al. |
| 8,468,608 B1 * | 6/2013 | Hernacki ............... G06F 21/10 726/1 |
| 2009/0089125 A1 | 4/2009 | Sultan |
| 2009/0204785 A1 | 8/2009 | Yates, Jr. et al. |
| 2009/0205016 A1 | 8/2009 | Milas |
| 2009/0217344 A1 * | 8/2009 | Bellwood ............... G06F 21/10 726/1 |
| 2010/0250370 A1 | 9/2010 | Jones et al. |
| 2011/0055890 A1 * | 3/2011 | Gaulin ............... G06F 21/6218 726/1 |
| 2012/0216012 A1 | 8/2012 | Vorbach et al. |
| 2013/0029653 A1 | 1/2013 | Baker et al. |
| 2013/0253942 A1 | 9/2013 | Liu et al. |
| 2013/0298664 A1 | 11/2013 | Gillette, II |
| 2014/0115659 A1 | 4/2014 | Attfield et al. |

OTHER PUBLICATIONS

"Computer Networks", Tannenbaum, A. Andrew and Wetherall, D., 5th Ed. Prentice Hall (2010).
"Prolog Programming: A First Course", Brna, P. (Mar. 5, 2001).

* cited by examiner

SYSTEM FOR POLICY-MANAGED CONTENT PRESENTATION

CROSS-REFERENCE TO RELATED APPLICATIONS

This application is entitled to the benefit of, and claims priority to U.S. Provisional Application 61/937,749, filed on Feb. 10, 2014.

COPYRIGHT STATEMENT

All material in this document, including the figures, is subject to copyright protections under the laws of the United States and other countries. The owner has no objection to the reproduction of this document or its disclosure as it appears in official governmental records. All other rights are reserved.

TECHNICAL FIELD

The present invention relates generally to telecommunications, digital communication, computer security, computer technology, mobile computing.

BACKGROUND OF THE INVENTION

Recent years have brought the emergence and rapid proliferation of mobile computing devices such as mobile telephones or "handsets" with extensive computing, communication, and input and interaction capabilities ("smart phones") plus a growing array of other mobile computing devices such as touchscreen tablets, "netbooks", electronic document readers, and laptops in a wide range of sizes and with wireless and wired communication capabilities. This proliferation of mobile devices has been accompanied by complementary advances in development and adoption of long-range wireless broadband technologies such as 3G and 4G, as well as commonplace deployment of shorter-range wireless technologies such as the 802.11 series of wireless standards and "Bluetooth" short-range wireless, all with considerable bandwidth. These technologies span multiple radio frequency bands and protocols. Alongside the radio transceivers for such communications capabilities, many of these devices also contain an array of onboard sensors such as cameras, microphones, and GPS receivers plus other locating technologies, as well as considerable fixed-onboard and removable memory for information and multimedia storage. Furthermore, smartphones and similar devices are typically capable of running a wide variety of software applications such as browsers, e-mail clients, media players, and other applications, which in some cases may be installed by the user. New devices with Internet connectivity, such as various sensors and internet-connected household appliances are becoming available, forming a broadly connected "Internet of Things".

Along with the profusion of smartphones and other mobile, wireless-capable devices, there has also been a dramatic increase in the use of social networks and related technologies for information sharing for consumer as well as for professional uses. Furthermore, the possible professional and personal use of any given handset presents a complex set of usage contexts under which rules for device capability usage and information access need be considered. Such sophisticated devices and the complex network scenarios that they operate in provide new opportunities for sophisticated system for information anon selection and presentation. Current contextual news presentation services such as Google Now and Bing News are capable of presenting news such as traffic conditions and weather alerts to a given computing device in the context of parameters such as device location, filtered by user preferences. However, there exist substantial opportunities for a more broadly capable, secure information selection and presentation system with granular control of presented information in accordance with expressed requirements of multiple stakeholders, such as device users, emergency services groups, network operators, corporate governors, and regulatory bodies.

BRIEF SUMMARY OF THE INVENTION

The invention pertains to a system and method to display content, including data and messaging, based on a secure, policy-managed set of instructions for selecting, distributing, and presenting information on a device. The system accepts one or more streams of data in any digital form from one or more data sources. The content is assessed via a set of policy instructions that may include time, location, hierarchy of ownership, type of content, assessed importance of content, and display availability. Only approved content is transmitted to the device for display.

The system receives policy instructions from one or more sources that are processed to determine priority and applicability to the content. The content is then evaluated by the policy instructions to determine what content will or will not be transmitted to the device for display. The system is suitable for any type of display. The content can be temporarily serialized and stored in a database for offline processing. The policy instructions can be used to specify time-dependent content, location-dependent content, or can specify conditions by which the device interface is configured.

DETAILED DESCRIPTION OF THE INVENTION

The present invention is a secure, policy-managed content selection and presentation system for selecting, distributing, and presenting information on computing devices. The policy-managed display is a system consisting of an application or other executing entity or component thereof, running on a computing device and presenting selected information or other content on a display or other output device associated with that computing device, and having the selection of the presented information from one or more content sources performed through the application of rules expressed and organized within a policy-based content selection system. Such a content selection system may have a hierarchy of policy owners, for determining precedence of policy application, and may also include a method of ranking or prioritizing individual content items to be shown, given that the size of the display area will generally be constrained. One such policy-based system that could be utilized to perform the required content selection is that presented in international patent application PCT/US13/78004 ('004) the disclosure of which is included by reference as if fully set forth herein.

Figure 1:
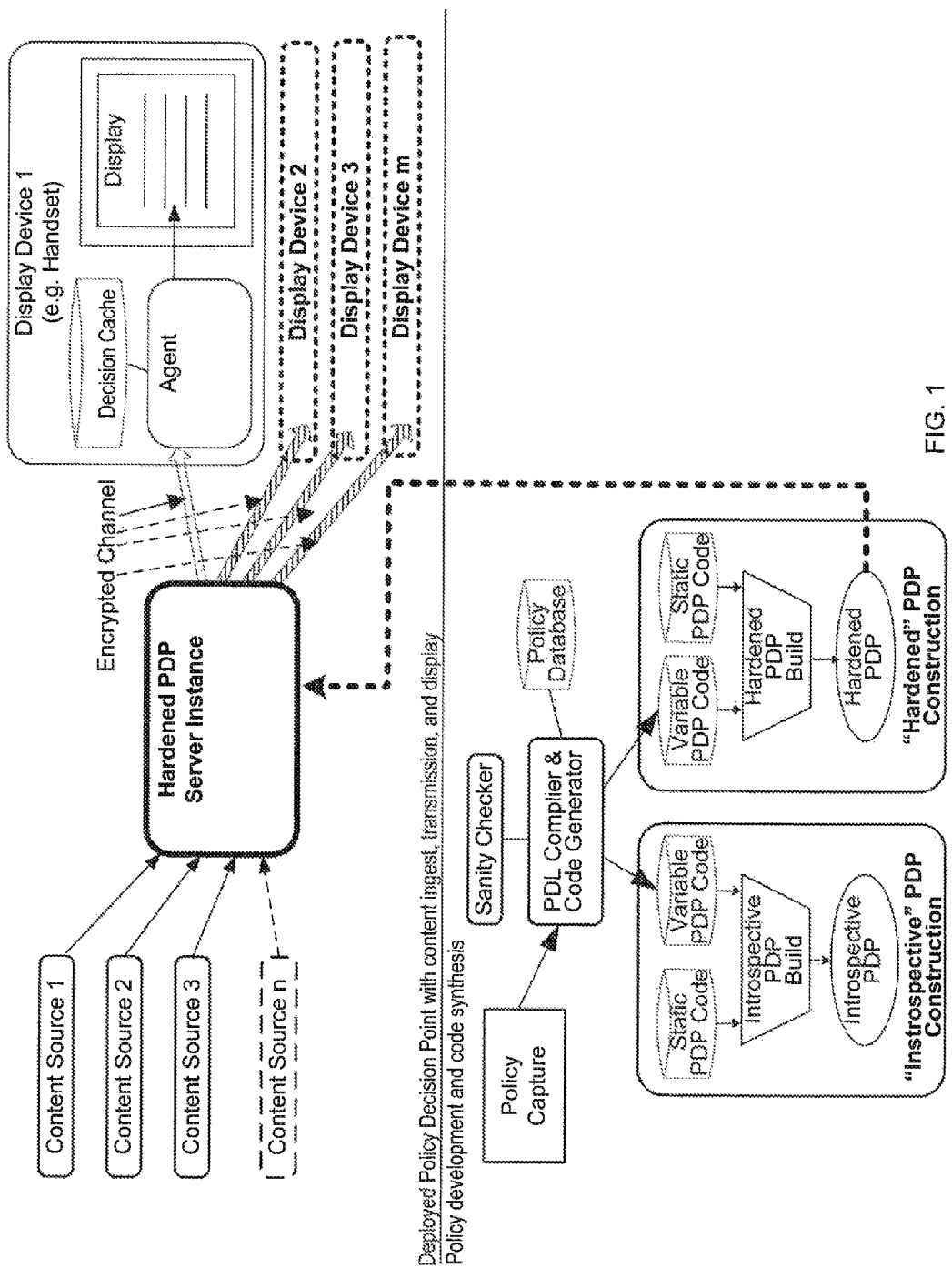
FIG. 1 is an example architecture for Policy-Managed Display System.

FIG. 1 presents one potential architecture for such a policy-managed display system, using such a content selection system. In FIG. 1, a Policy Decision Point (PDP) server is compiled from policies and supporting elements in a policy development and code synthesis environment such as that presented in patent application '004. The resultant PDP server instance ingests content for selection from one or more content sources, and selects content to be displayed to one or more display devices. Each display device may receive a distinct set of information to be displayed, with policy decisions governing which content is to be communicated to, and displayed on the device being made by the PDP server, potentially with consideration of contextual information from each device and other available data relevant to specified policy decisions.

Figure 2:
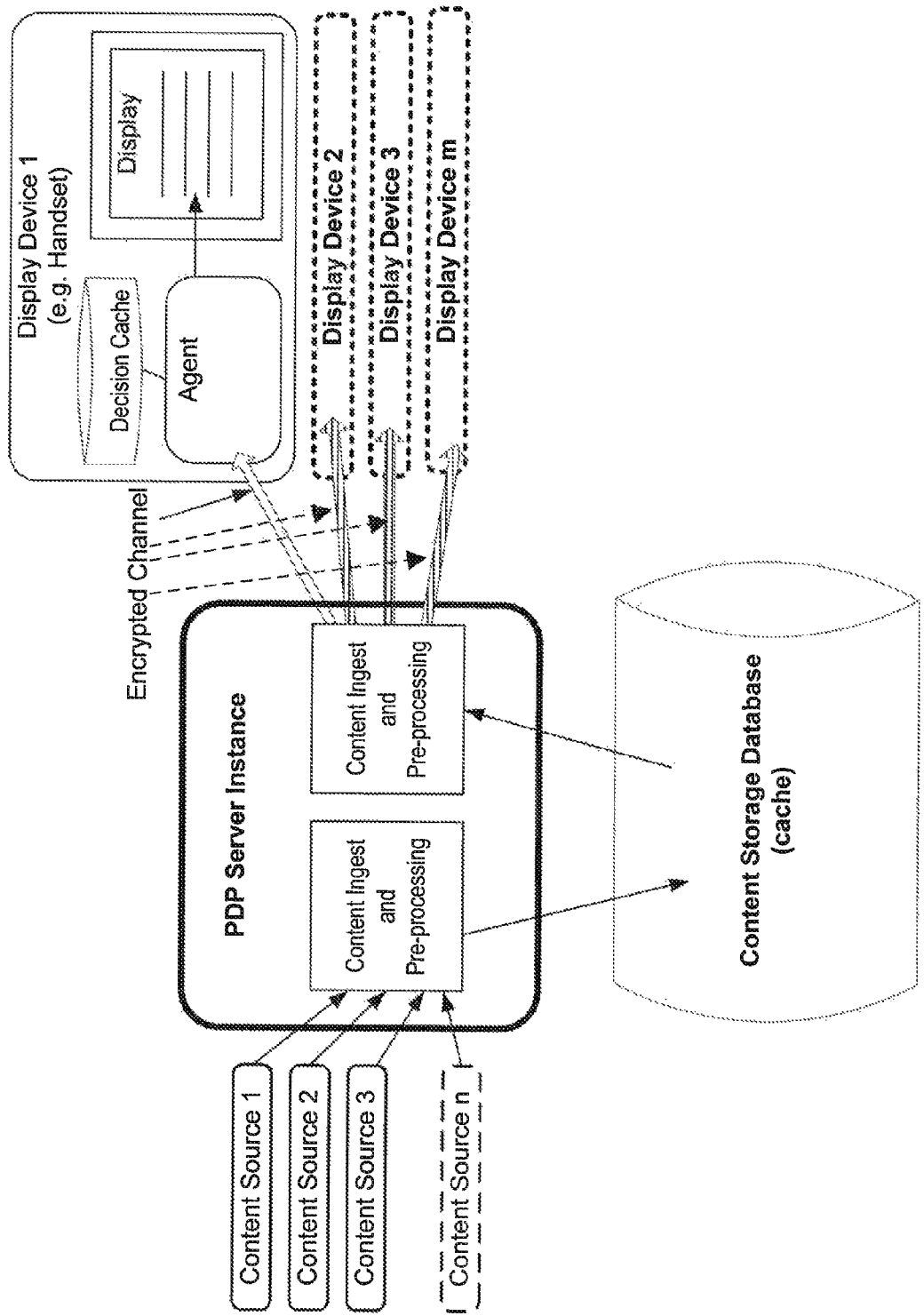
FIG. 2 is the Policy-Managed Display system with content storage database.

FIG. 2 presents a candidate augmented architecture for our invention, beyond that shown in FIG. 1. In FIG. 2, candidate content for display is retrieved from content sources and serialized in a database accessible by the PDP server. In this case, temporarily available information can be saved in the database for asynchronous, later display on a device. This suits cases where the device may be temporarily offline or otherwise unavailable. In such an architecture, policy for selecting content for potential display can be applied either at the ingest side, as a filter prior to storage, and/or on the output side, such as via a policy-driven query to pull data from the database before transmission to a device.

In the case that the content presentation is accomplished via a visual display, the physical display area being managed may be all or a portion of the available electronic display area on the computing device itself, or of some other external display coupled to the device by wired or wireless means. An alternative or supplementary form of presentation of the selected content would be through the use of audio notifications, either via recorded audio transmissions or synthesized speech (text-to-speech conversion), or, some form of alarm sound or warning tone.

Another alternative form of presentation or notification of content is through the use of variations in adjustments to elastic or other transducers that can then cause a human to react. Such transducers might be mounted or otherwise located within clothing such as socks, shirts, trousers, or underwear, or attached to glasses or hats.

Hardcopy output of the managed display content to a device such as a printer is also contemplated by the invention, and may also be specified by policy. In the case of electronic display, the programmed form of the managed displaying entity may be a widget, applet, tile, application window, desktop or some near-equivalent to these presentation forms, rendered on an end point device or potentially on a customizable notification screen. Non-limiting examples of devices on which the display presentation could be made include a TV. PC, tablet, mobile phone, electronic timepiece, electronic billboard, or public news display screen.

The present invention also contemplates any other forms of output as the means of information presentation that is controlled by policy. Other specific, non-limiting examples include potential presentation devices such as implanted or otherwise human-proximal devices such as hearing aids, inner ear transducers, wearable optical outputting devices such as Google Glass, pressure transducers, or retinal display.

While the system and techniques described herein are notably applicable to mobile handsets, it is also the case that much of what is described can be applied to other areas of information selection and presentation. Neither the description nor the examples used in this present document should be taken as limiting the generality or the applicability of the system and the techniques presented to mobile handsets and wireless networks specifically, although they are immediately applicable in those areas.

The application would display content gathered from at least one source, and potentially from many, disparate local and/or external sources. Apart from common internet-accessible sources such as news sites and news feeds, data to be displayed may also be sourced from other devices and sensors, such as a nearby phone, temperature sensor or traffic flow level indicator. The presence of a known phone could be used to indicate and display the presence of a co-worker. A high temperature reading from a device of a nearby firefighting team member could be the source for a displayed emergency alert. The specific information and/or the format that the information is shown to the user would be based on rules contained within policy and those rules may incorporate use of specific contextual data from the device, and/or from other sources, with the contextual information then being used within policies for content selection. As one non-limiting example of such contextual data, device location data obtained from onboard GPS sensors might be used within a policy for deciding on the display of local weather or local emergency information. As a second non-limiting example, the enable/disabled status of a device-borne sensor such as a camera or microphone might be used within a decision to display a privacy or security related warning message in the policy-managed display of the device.

One embodiment of the present invention utilizes the Policy Enforcement Point (PEP) and Policy Decision Point (PDP) architecture that Sequitur Labs has previously disclosed in U.S. application Ser. No. 13/945,677, the disclosure of which is incorporated as if fully set forth herein, for the purposes of providing the means of policy specification and decision computation, access and control of contextual data sources such as device-borne sensors, and the secure content dissemination to the managed display. The present display application in this embodiment is therefore an extension of that core technology.

Policies can also be utilized to control not only the content of the display, but also to prescribe formatting and layout of the content to be presented. For example, individual formatting elements such as character sizes and line spacing may be dynamically specified by policy decisions to cause visible highlighting of high priority information, or to optimize the available display area. Such formatting specification could be expressed, in the case of HTML content, in the form of dynamically written cascading style sheets (CSS) defined from policy and supporting contextual information. Other content display attributes such as paging, scrolling controls and scrolling rates, and content navigation controls may also be defined and decided upon from policy, and then communicated to the device.

The display of information on the receiving device may be time-dependent, and updates may be triggered by events on the device or elsewhere. For example, an "unlock" of the device from a gesture such as a finger swipe or button press may trigger a request from the device to the PDP server, for new content to be displayed. Conversely, policy may express that notification of a major news event or emergency be "pushed" to the device from the PDP server, or that news presentation be refreshed at specific times of day or at specific intervals.

Figure 3:
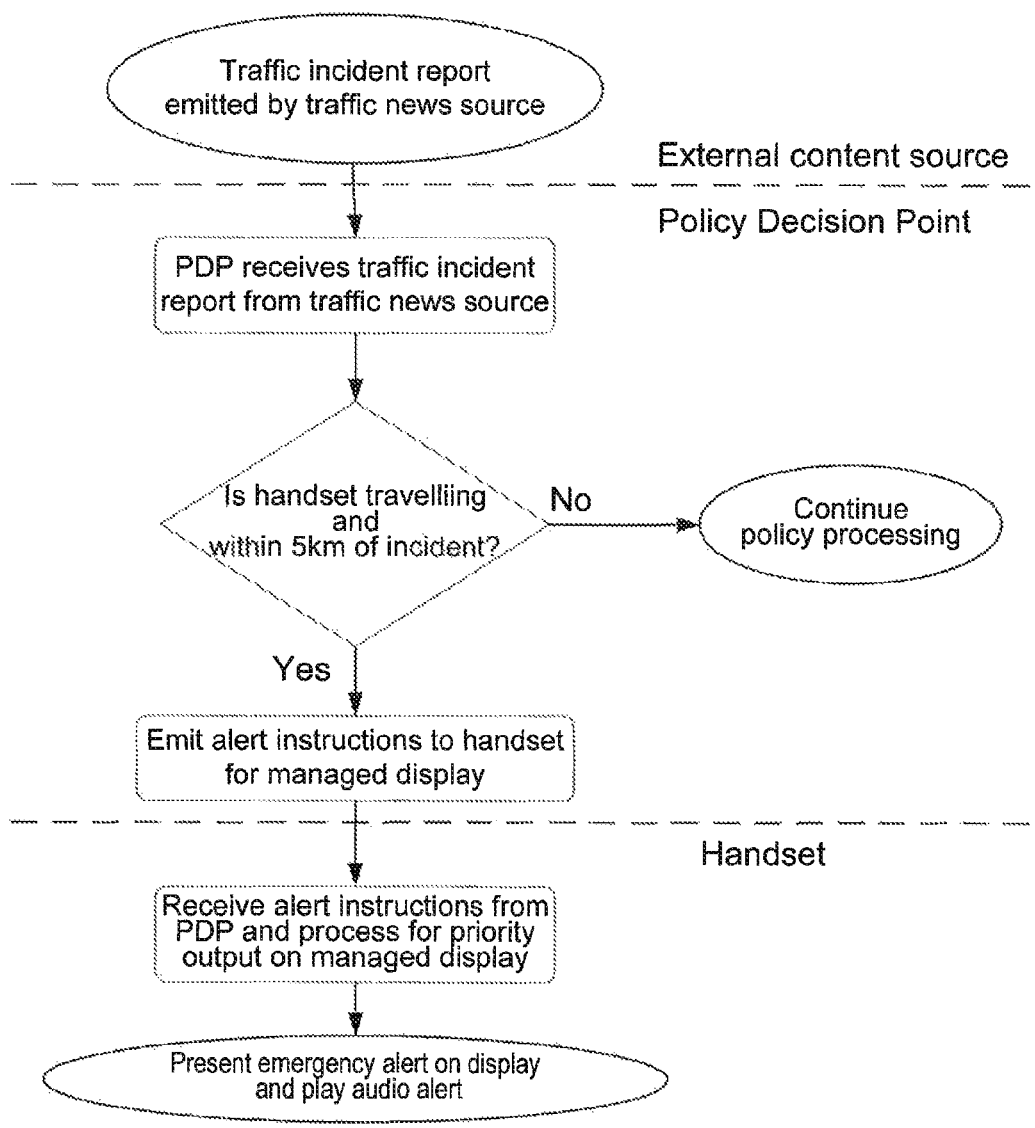
FIG. 3 is an example flowchart of traffic incident alert processing and presentation.

One non-limiting example of such a presentation of emergency alert information is illustrated in FIG. 3, in this case, the content source is a traffic condition alert service, and the content consists of a traffic emergency incident. A policy exists that specifies that in the case of the handset being within a distance such as 5 kilometers of the incident, and not connected to an 802.11 fixed network, the traffic incident alert plus helpful warning information is to be shown on the managed handset display. Upon receipt and ingest of the incident information, the PDP applies the policy using the latest reported handset position and connectivity status, and pushes an alert to the handset, to be displayed to the user in the managed display area. An audible alert tone is also issued using the handset speaker and supporting audio capabilities.

Figure 4:
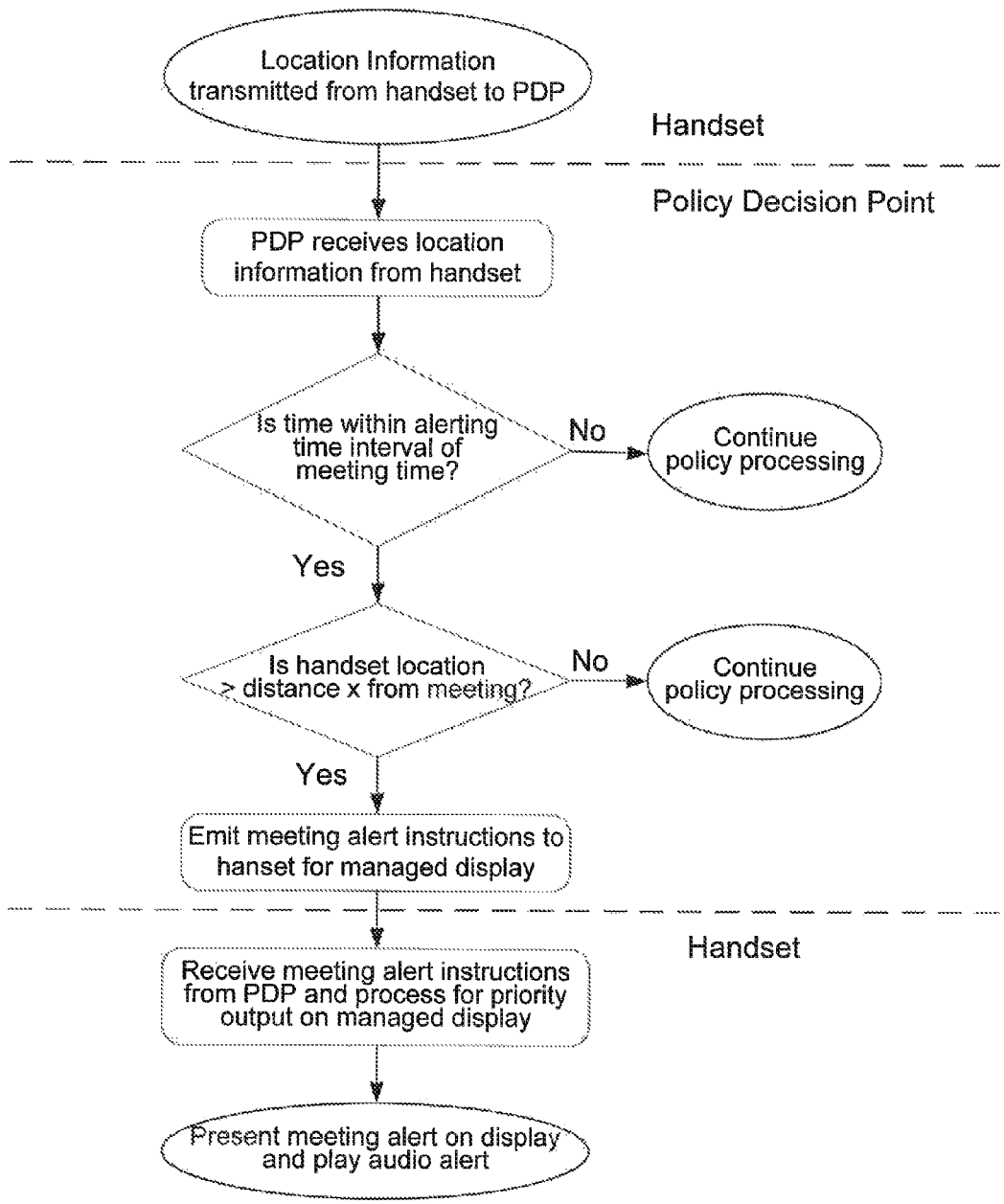
FIG. 4 is an example flowchart of scheduled event notification with location coupling.

A second non-limiting example of our invention, using data local to the device, combined with policy housed in the PDP, is a scheduled event alert coupled with location information, is presented in FIG. 4. In this example, the handset user has previously entered in their schedule that they have a meeting at location l1, at a time t1. Policy housed in the PDP states that the handset is to present a reminder notice in the managed display, informing the user to commence travel to a scheduled meeting, if the handset location is determined to be further than a distance x, such as 100 m, from l1, at a time t2 where t2 is within some time interval such as 5 minutes, of t1. On examination of the policy in the context of the handset location information recently received, the PDP will push a notice to the handset triggering a reminder notice to be displayed in the managed display, along with the playing of an audible alert using the handset speaker and supporting audio capabilities.

INDUSTRIAL APPLICATION

Many application areas exist for our invention. The following is a non-limiting list of application examples. In some cases, policy is utilized to link together related content from distinct sources:
1) Executive dashboards: high priority or strategic corporate summary information is presented
2) Email (and other messaging) prioritization: policy is applied to rank and present important messages
3) Linking and displaying data for meeting reminders: one content source may have a meeting schedule for a customer, and another, information that the customer has an overdue bill
4) Policy Reminders: a mobile employee travelling to a foreign country is notified of intellectual property policy in regard to the destination country
5) Healthcare Reminders: linking medical records to patient scheduling and location
6) Emergency Services: all employees devices would warn of inclement weather policies or tell them to call police or other parties based on contextual data and policy requirements
7) Advertising: This display technology could be used as a method for more quickly and securely displaying ad content to users
8) Regulatory compliance: Policy can be applied to appropriately manage and control certain types of information that could be presented to certain individuals, as regulated by privacy laws or other standards. For example HIPAA compliance requires that nurses have one set of information while physicians have another. Authentication and policy are therefore very important, and our invention is well suited to this purpose.

What is claimed is:

1. A secure system for displaying policy-managed content on at least one output device based on contextual information, said system comprising:
   a receiver subsystem having a network interface for receiving the contextual information from the at least one output device, and for processing the content;
   a hardened Policy Decision Point (PDP) server, coupled to the receiver subsystem, the PDP server having hierarchical sets of policy instructions, the PDP server to evaluate the contextual information and to select and apply a set of policy instructions applicable to the content from the hierarchical sets of policy instructions based on the contextual information, wherein the content is processed in accordance with the applied set of policy instructions; and
   a Policy Enforcement Point (PEP) server coupled to the PDP server via an encrypted back-channel for receiving the processed content based and for transmitting the processed content to the at least one output device for display, the at least one output device having no access to the hierarchical sets of policy instructions.

2. The system of claim 1 wherein the output device is one of:
   all or part of a region of a video display;
   a wearable optical display device;
   an audio speaker;
   a pressure transducer,
   a 3D printer; and
   a hardcopy output device.

3. The system of claim 1, wherein the content includes one or more of:
   conventional web-accessible data;
   direct messaging from other devices;
   direct data feeds from external sensors;
   third-party data from an external service or application;
   a summary of corporate information;
   a meeting invitation, alert, or schedule reminder; and
   an emergency alert.

4. The system of claim 1, wherein the receiver subsystem further includes:
   a network connection for receiving and transmitting contextual information;
   a memory for temporary storage of contextual information awaiting policy processing; and
   an editor subsystem for receiving instructions for modifying and manipulating the content in accordance with the applied set of policy instructions.

5. The system of claim 1, wherein the interface for retrieving a set of policy instructions further includes:
   a network connection for transmission and reception of policy instructions; and
   a memory for temporarily storing policy instructions to await execution.

6. The system of claim 1, wherein the PDP server further includes:
   a hierarchical selection system of policy owners to determine the precedence of policy application; and
   a subsystem for ranking priority of policy instructions based on hierarchy, type of contextual information, the assessed importance of the contextual information, and output device availability.

7. The system of claim 1, wherein the PDP server further includes a subsystem for managing time-dependent policy instructions.

8. The system of claim 1, wherein the PDP server further includes a subsystem for managing location-dependent policy instructions.

9. The system of claim 1, wherein the PDP server further includes a subsystem for selecting contextual information based on policy instructions pertaining to the location of the user in relation to the location of the output device.

10. The system of claim 1, wherein the PDP server further includes:
a subsystem for managing the visual layout and formatting of the content on a graphical display; and
a subsystem for the selection of interaction techniques and interface components appropriate for the specific content managed by the policy instructions.

11. The system of claim 1 wherein the PDP server evaluates content received from one or more sources, selects content to be displayed, and transmits the content to the at least one output device for display.

12. The system of claim 11 further including a content storage database for serialization of external information content awaiting processing by the PDP server and subsequent transmission to the at least one output device.

13. The system of claim 1, wherein the policy instructions pertain to a set of regulations for insuring compliance therewith.

14. A method for displaying policy-managed content on at least one output device, the method comprising the steps of:
receiving the content from one or more sources;
receiving the contextual information from the at least one output device;
evaluating the contextual information from the at least one output device;
receiving hierarchical sets of policy instructions;
selecting a set of policy instructions from the hierarchal sets of policy instructions based on the contextual information received from the at least one output device;
applying the selected set of policy instructions to the content;
processing the content in accordance with the applied set of policy instructions;
receiving the processed content via an encrypted backchannel from a hardened policy decision point (PDP) server; and
transmitting the processed content to the at least one output device for display, the at least one output device having no access to the hierarchical sets of policy instructions.

15. The method of claim 14, further including the step of storing content in a serialized form in a storage database to await processing by the PDP.

16. The method of claim 14 further including the step of assessing the sets of policy instructions based on hierarchy of ownership, type of contextual information, the assessed importance of the contextual information, and output device availability.

17. The method of claim 14 further including the steps of:
assessing the sets of policy instructions based on temporal dependency of the contextual information; and
assessing the set of policy instructions based on locational dependency of the contextual information.

18. The method of claim 14 further including the steps of:
managing the visual layout of the output device based on policy instructions; and
selecting interaction techniques and interface components appropriate for the content based on policy instructions.

* * * * *